US012206876B1

(12) United States Patent
Trost (10) Patent No.: US 12,206,876 B1
(45) Date of Patent: Jan. 21, 2025

(54) VECTORIZED RANDOM FOREST SEARCH

(71) Applicant: Harmonic, Inc., San Jose, CA (US)

(72) Inventor: William R. Trost, Aloha, OR (US)

(73) Assignee: Harmonic, Inc., San Jose, CA (US)

( * ) Notice: Subject to any disclaimer, the term of this patent is extended or adjusted under 35 U.S.C. 154(b) by 494 days.

(21) Appl. No.: 17/222,519

(22) Filed: Apr. 5, 2021

Related U.S. Application Data (60) Provisional application No. 63/006,549, filed on Apr. 7, 2020.

(51) Int. Cl.
*H04N 19/42* (2014.01)
*G06N 5/01* (2023.01)
*G06N 20/20* (2019.01)
*H04N 19/14* (2014.01)
*H04N 19/172* (2014.01)
*H04N 19/96* (2014.01)

(52) U.S. Cl.
CPC ............... *H04N 19/42* (2014.11); *G06N 5/01* (2023.01); *G06N 20/20* (2019.01); *H04N 19/14* (2014.11); *H04N 19/172* (2014.11); *H04N 19/96* (2014.11)

(58) Field of Classification Search
CPC ..................................................... H04N 19/42
USPC ..................................................... 375/240.08
See application file for complete search history.

(56) References Cited

U.S. PATENT DOCUMENTS

| | | | |
|---|---|---|---|
| 2005/0244076 A1* | 11/2005 | Ratakonda | H04N 19/436 375/E7.103 |
| 2018/0121826 A1* | 5/2018 | Nugent | G06N 5/01 |
| 2020/0125568 A1* | 4/2020 | Idicula | G06N 20/20 |
| 2020/0327357 A1* | 10/2020 | Karnagel | G06F 18/2148 |

OTHER PUBLICATIONS

Marpe, Detlev and Wiegand, Thomas, "The H.264/MPEG4 Advanced Video Coding Standard and its Applications," IEEE Communications Magazine, Aug. 2006, pp. 134143.

* cited by examiner

*Primary Examiner* — Yulin Sun
(74) *Attorney, Agent, or Firm* — Brokaw Patent Law PC; Christopher J. Brokaw (57) ABSTRACT

Encoding a digital video using a Single Instruction Multiple Data (SIMD) operation. Advantageously, digital video may be encoded in a manner that conserves computational resources. A software encoder searches a decision tree in a random forest in furtherance of encoding of the digital video by causing a physical hardware component to perform a single operation on multiple data operands concurrently. The single operation may be a comparison of two or more thresholds of a single feature of a single frame, or a portion thereof, of the digital video. The decision tree may be arranged to position comparisons involving a single feature near the root of the decision tree.

15 Claims, 6 Drawing Sheets

| Feature[2] | | Feature[3] | | Feature[4] | | | |
|---|---|---|---|---|---|---|---|
| (-∞, 786.5) | | | | (-∞, 0.1) | [0.1, 0.3) | [0.3, 0.5) | [0.5, ∞) |
| | | (-∞, 0.5) | | 13 | 18 | 18 | ... |
| [786.5, ∞) | | | | 32 | 32 | -6 | ... |
| | | [0.5, ∞) | | 23 | 23 | -6 | ... |

510, 512, 514 label the last three columns; 520, 522, 524, 526 label the data rows.

VECTORIZED RANDOM FOREST SEARCH

CLAIM OF PRIORITY

This application claims priority to U.S. Provisional Patent Application Ser. No. 63/006,549, filed Apr. 7, 2020, invented by William Trost, entitled "Vectorized Random Forest Search," the entire contents of which are hereby incorporated by reference for all purposes as if fully set forth herein.

FIELD OF THE INVENTION

Embodiments of the invention relate to encoding a digital video in an efficient manner.

BACKGROUND

Due to the large size of raw digital video files, digital video content is generally stored and accessed in a compressed form. The way in which a digital file is compressed is governed by the video standard used to compress the digital file. Non-limiting, illustrative examples of video compression standards include those video standards belonging to the "MPEG" (Motion Picture Experts Group) family that notably comprises the MPEG-2, AVC (Advanced Video Compression or H.264), and HEVC (High Efficiency Video Compression or H.265) standards.

It is common for video display devices to have access to different amounts of network bandwidth. It is also common for network conditions to vary over time. The current conditions of the network can affect the quality of the digital video being transmitted over a network, as higher quality video generally requires a greater amount of bandwidth to transmit.

The large diversity in the capabilities of clients, video compression standards, digital video resolutions, and available network bandwidth are but some of the factors that lead to the large combination of possible video types and formats that must be supported to serve a wide range of customers by content delivery platforms. For this reason, video encoders are often required to encode digital video to support a large variety of possible video types and formats. As processing resources are always finite in any deployment, it is advantageous for video encoders to perform the work of video encoding in an efficient manner so that processing resources may be conserved.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for encoding a digital video using a Single Instruction Multiple Data (SIMD) operation to efficiently search a random forest are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Functional Overview

Embodiments of the invention are directed towards encoding a digital video using a Single Instruction Multiple Data (SIMD) operation. Advantageously, embodiments enable digital video to be encoded using fewer computational resources than prior approaches, thereby facilitating their use elsewhere. As described in more detail herein, in an embodiment, a software encoder uses a random forest tree decision tree in furtherance of encoding of the digital video. The searching of a random forest decision tree may be performed for a variety of reasons, such as, for example, in estimating the complexity of a frame of digital video. To search the random forest decision tree efficiently, the software encoder may cause a physical hardware component to perform a single operation on multiple data operands concurrently. For example, the physical hardware component may be implemented in an embodiment by Instruction Set Extensions for performing Single Instruction Multiple Data (SIMD) operations available from Intel Corporation of Mountain View, California. Other embodiments and features will be discussed below.

System Overview

Figure 1:
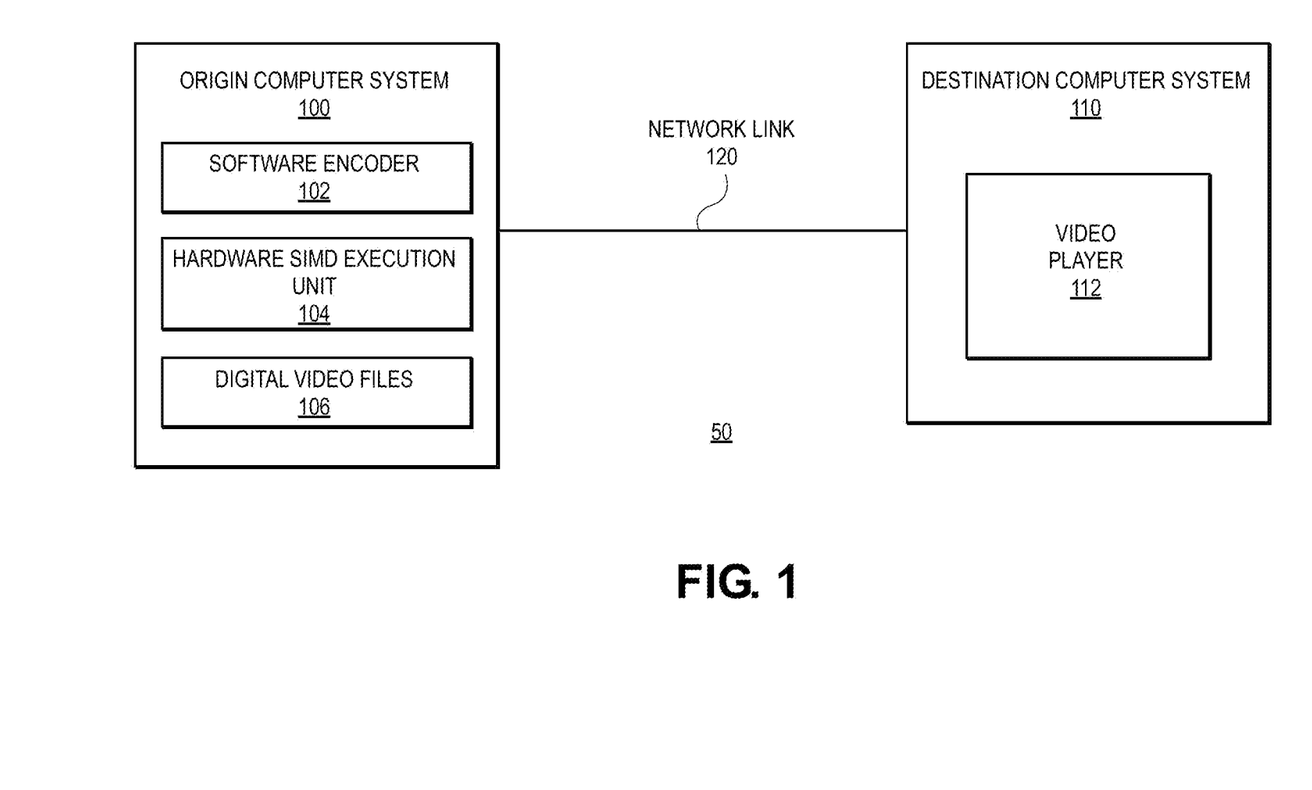
FIG. 1 is a block diagram of a system that comprises an encoder in accordance with an embodiment of the invention.

FIG. 1 is a block diagram of system 50 that comprises a software encoder that operates in accordance with an embodiment of the invention. System 50 depicts a simple, exemplary system comprising a single software encoder capable of encoding a digital video that can be delivered to a different device and subsequently played thereon using a video player. Those in the art will readily appreciate that practical deployments may employ multiple software encoders and a large plurality of video players.

FIG. 1 depicts a single origin computer system 100 that executes at least one software encoder 102 and a single destination computer system 110 that executes video player 112. Origin computer system 100 may be deployed in a cable headend or operating facility of a content delivery network (CDN), but it need not be, as origin computer system 100 may be deployed in closer proximity to destination computer system 110, e.g., at an edge node. Practical deployments will typically comprise a plurality of origin computer systems, each of which communicates with a plurality of destination computer systems 110.

Software encoder 102, as broadly used herein, represents any software encoder capable of encoding a digital video using a Single Instruction Multiple Data (SIMD) operation. Software encoder 102 may correspond to the Harmonic PURE Compression Engine for ElectraX, ElectraXOS, and VOS software, all of which are available from Harmonic, Inc. of San Jose, California. Software encoder 102 employs one or more random forest decision trees when encoding a digital video for a variety of purposes, such as without limitation estimating the complexity of digital video.

Hardware SIMD execution unit 104, as broadly used herein, corresponds to any physical mechanism for performing a Single Instruction Multiple Data (SIMD) operation. A non-limiting, illustrative example of hardware SIMD execution unit 104 is the Streaming SIMD Extensions (SSE) instruction set extensions to the x86 architecture available from Intel Corporation of Mountain View, California.

Digital video files 106, as broadly used herein, represents the plurality of digital video content used as both input to and output from encoder 102. In the course of performing work, encoder 102 may process a digital video file 106, stored at least in part, on computer system 100, to process an encoded digital video file, which may then be stored on computer system 100 as part of digital video files 106 or transmitted over network link 120 to destination computer system for decoding and potential display using video player 112.

Video player 112 represents any mechanism for decoding and playing a digital video. In other embodiments not depicted in FIG. 1, video player 112 may be replaced with a video decoder, which is responsible for decoding video content but not playing the decoded video content. For example, destination computer system 110 may be responsible for decoding or uncompressing digital video transmitted from origin computer system 100 over network link 120 in order to facilitate further processing to be performed on the decoded or uncompressed digital video.

Network link 120, as broadly used herein, represents any mechanism for exchanging data packets between origin computer system 100 and destination computer system 110. Network link 120 may be implemented, for example, by a wireless network or by a wired network. The exchange of data packets over network link 120 may be performed using a variety of different protocols, including without limitation Transmission Control Protocol (TCP) and User Datagram Protocol (UDP). To provide a concrete example, network link 120 may be implemented using a TCP connection that extends over at least the last mile network to a cable customer device (i.e., customer premises equipment or (CPE)).

The effective bandwidth available to network link 120 will fluctuate over time for various reasons. For example, effective bandwidth available to network link 120 will vary based on network connections carried at any given time over network link 120. As another example, within a user's residence, radio interference can degrade the connection between the user's device consuming the video stream and any Wi-Fi router used by the user. Other sources of intermittent noise and interference in the field can degrade the available bandwidth on network link 120.

Encoding a Digital Video Using a SIMD Operation

A random forest is classification method used in certain Machine Learning (ML) algorithms. Software encoder 102 employs one or more random forests when encoding a digital video. Each random forest comprises one or more decision trees. Embodiments may further increase the compression efficiency of video compression performed by software encoder 102 so that software encoder 102 is able to encode digital video using fewer CPU cycles. The beneficial increase to efficiency is realized by an embodiment by improved approaches for searching decision trees of a random forest employed by software encoder 102. Embodiments of the invention reduce the number of CPU cycles required to search the random forests used in certain encoder libraries.

A random forest may be used in comparing features of a frame of digital video. As used herein, a feature of digital video is any characteristic of a portion of digital video which may be quantized or expressed as a numerical value, such as but not limited to the complexity of a digital video frame or some portion thereof.

Figure 2:
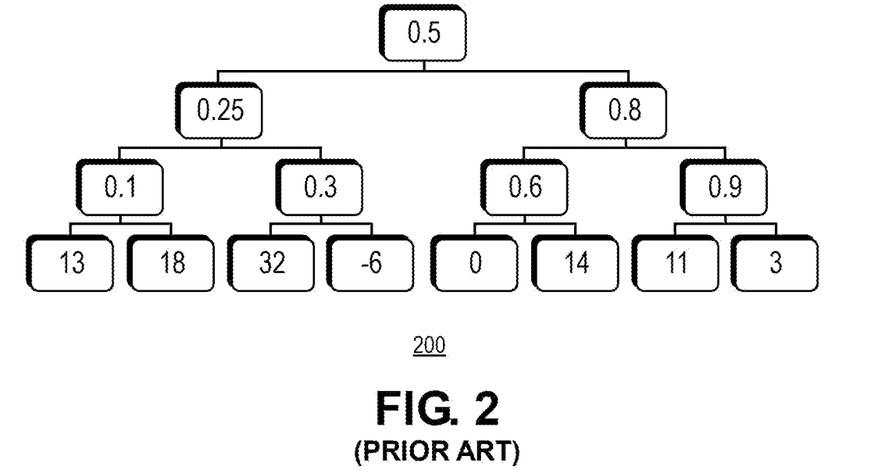
FIG. 2 is an illustration of an exemplary random forest that may be used by a software encoder in accordance with the prior art.

To illustrate, FIG. 2 is an illustration of an exemplary random forest 200 that may be used by software encoder 102 in accordance with the prior art. Software encoder 102 might use random forest 200 to obtain a result value in estimating the complexity of a portion of a digital video frame. To obtain a result value, software encoder 102 might first compare a certain feature of the digital video frame against the value of 0.5 shown in the root node of random forest 200. If the feature has a value that is less than a value of 0.5, then the left branch of the tree is taken; alternately, if the feature has a value than its greater than a value of 0.5, then the right branch of the tree is taken. Comparisons are made in this fashion until the random tree is traversed to a leaf node, at which time the value in that leaf node represents the appropriate result value. For example, if the value of the feature in question is greater than a value of 0.25 but less than a value of 0.3, the result value is 32, and if the value of the feature in question is greater than 0.8 but less than a value of 0.9, then the result value is 11.

Figure 3:
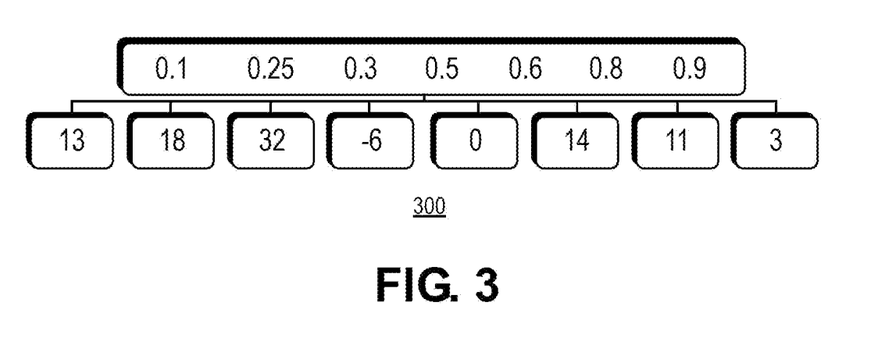
FIG. 3 is an illustration of an exemplary random forest that may be used by software encoder in accordance with an embodiment of the invention.

FIG. 3 is an illustration of an exemplary random forest 300 that may be used by software encoder 102 in accordance with an embodiment of the invention. Random forest 300 of FIG. 3 represents the same information depicted by random forest 200; nevertheless, embodiments may traverse random forest 300 using less comparisons. Embodiments of the invention may construct random forest 300 of FIG. 3 from random forest 200 shown in FIG. 2 by using software to construct a Directed Acyclic Graph (DAG) that clusters comparisons of a single feature as near the root of random forest 300 as possible. This DAG is then used to generate vector instructions that permit random forest 300 to be searched using fewer comparison operations than that required by the naïve non-vectorized implementation shown in FIG. 2. As shown in random forest 300, a SIMD operation may be performed against the value of feature in question to compare it against the values of 0.1, 0.25, 0.3, 0.5, 0.6, 0.8, and 0.9 simultaneously. As a consequence, it is possible to identify, in a single operation, whether the value of the feature in question is (a) less than a value of 0.1, (b) between a value of 0.1 and 0.25, (c) between a value of 0.25 and 0.3, (d) between a value of 0.3 and 0.5, (e) between a value of 0.5 and 0.6, (f) between 0.6 and 0.8, (g) between a value of 0.8 and 0.9, and (h) greater than a value of 0.9. The answer of which range is satisfied by the value of the feature determines which branch of random forest decision tree 300 should be traversed. For example, if the third range of answers is satisfied (i.e., a value of 0.25 to 0.3), then the third branch of the random forest 300 should be traversed to obtain the result value of 32. As another example, if the fourth range of answers is satisfied (i.e., a value of 0.3 to 0.5), then the fourth branch of the random forest 300 should be traversed to obtain the result value of −6.

Advantageously, software encoder 102 of an embodiment may search the random forest in parallel using hardware SIMD execution unit 104 to perform a single operation on multiple data operands concurrently. In this way, embodiments of the invention may compare two or more thresholds of a single feature of a single frame, or a portion thereof, of digital video.

Figure 4:
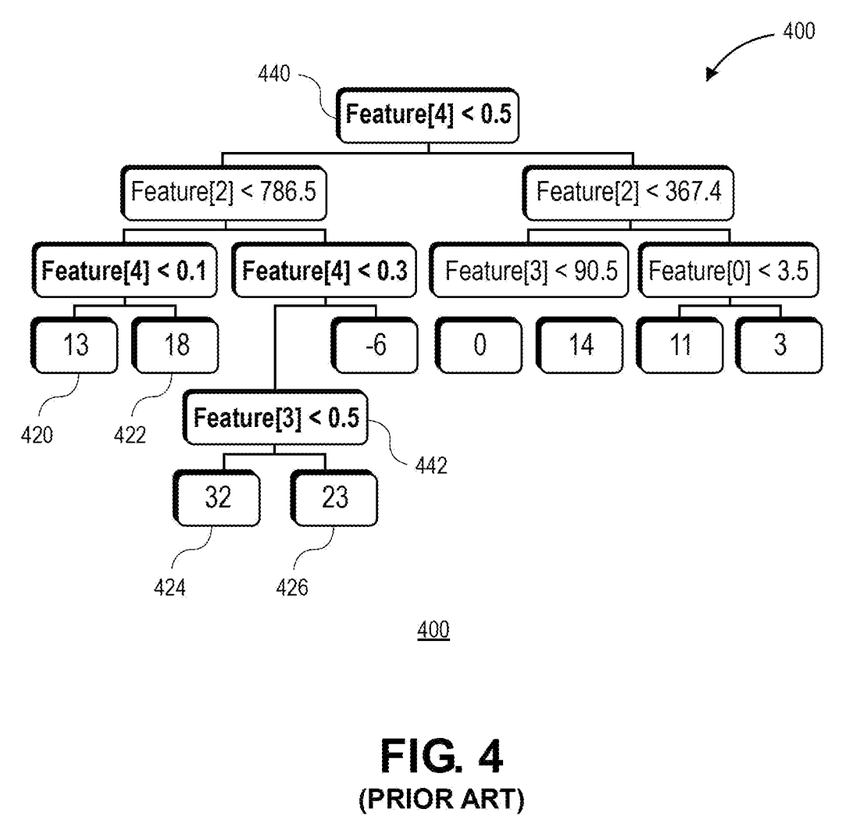
FIG. 4 is an illustration of a random forest depicting an array of features in accordance with the prior art.

As another example, consider FIG. 4, which is an illustration of random forest 400 depicting an array of features in accordance the prior art. Random forest 400 depicts data operands of a plurality of features arranged in a decision tree. The decision tree comprises a root node 440. One or more child nodes have root node 440 as their parent, e.g., in FIG. 4, root node 440 has two child nodes. Each node of the decision tree identifies a comparison operation to be made against a particular feature, unless the node is a leaf node, in which case the leaf node comprises a result value. For example, node 442 identifies the comparison operation of determining whether feature 3 has a value less than 0.5, while leaf node 424 comprises the result value of 32. Software encoder 102 may search random forest 400 to retrieve a result value identified by a leaf node, such as leaf nodes 420, 422, 424, and 426.

Embodiments of the invention may represent random forest 400 shown in FIG. 4 as a directed acyclic graph (DAG). Using a DAG to express the same logic as shown in a random forest is advantageous because doing so enables the DAG to be represented using a smaller amount of code and data, which by extension enables faster computations to be realized using a DAG due to the greater availability of cache memory.

Figure 5:
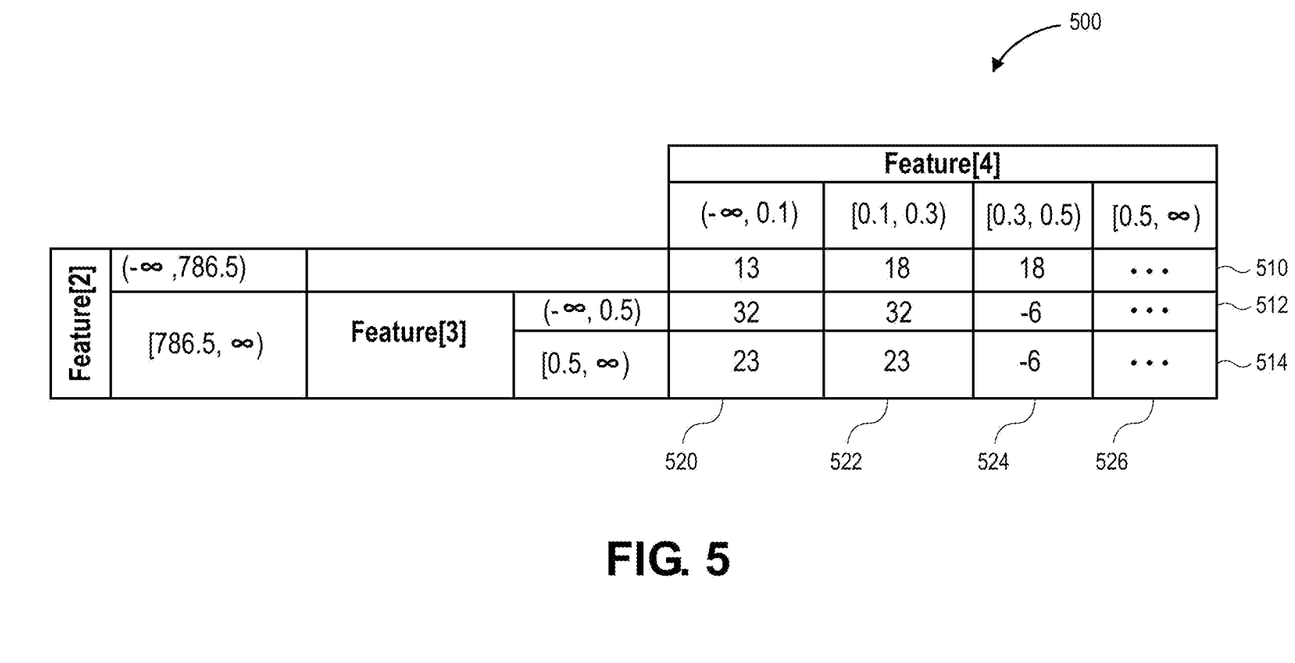
FIG. 5 is a table depicting a process step of vectorizing a random forest decision tree in accordance with an embodiment.

FIG. 5 is table 500 depicting a process step in vectorizing a random forest decision tree in accordance with an embodiment. Table 500 depicts a grid of result values. An appropriate result value may be obtained by correlating the appropriate values of features, such as for example, feature 2, feature 3, and feature 4. The result values shown in table 500 are the same as those shown in random forest 400 of FIG. 4. As shown in table 500, row 510 comprises all possible result values when feature 2 is less than 786.5, row 512 comprises all possible result values when feature 2 is greater than or equal to 786.5 and feature 3 is less than 0.5, and row 512 comprises all possible result values when feature 2 is greater than or equal to 786.5 and feature 3 is greater than or equal to 0.5. Similarly, column 520 comprises all possible result values when feature 4 is less than or equal to 0.1, column 522 comprises all possible result values when feature 4 is between 0.1 and 0.3, column 524 comprises all possible result values when feature 4 is between 0.3 and 0.5, and column 526 comprises all possible result values when feature 4 is greater than or equal to 0.5.

Figure 6:
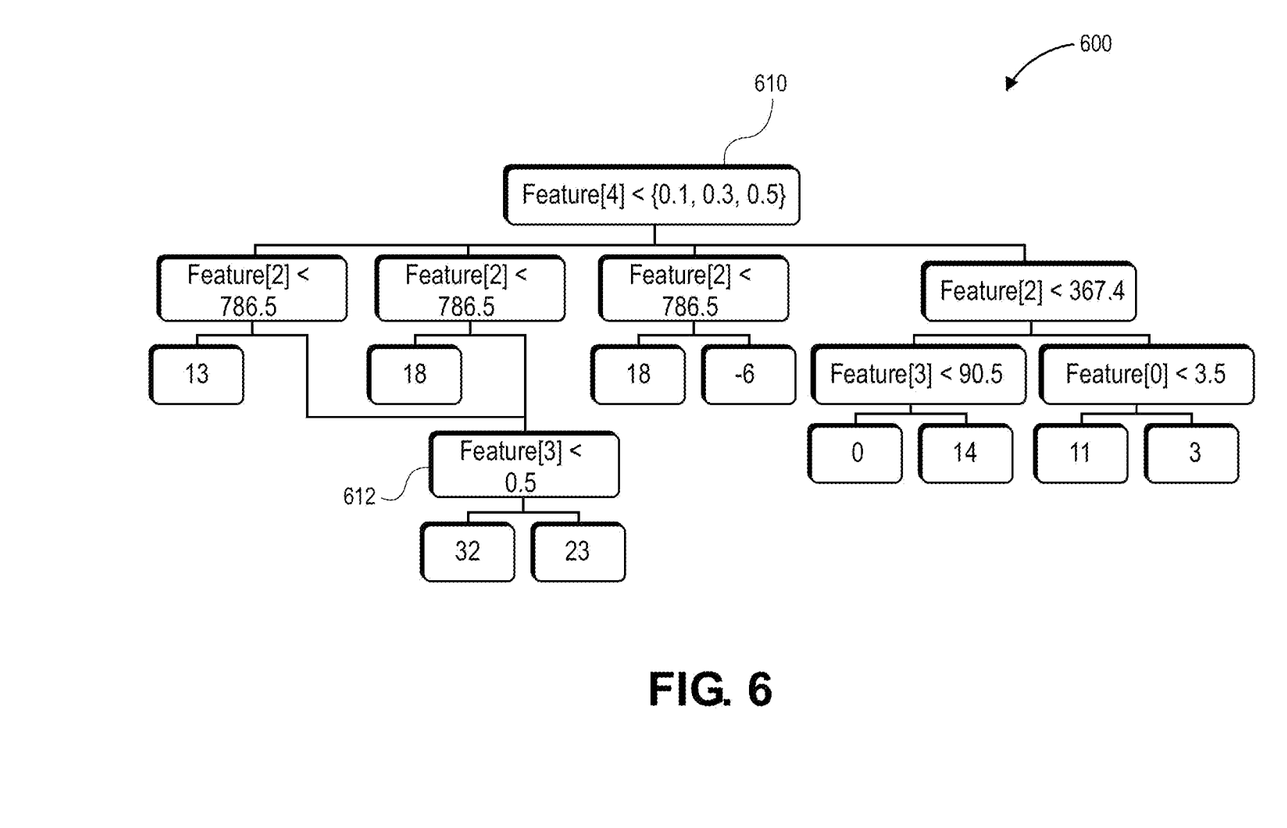
FIG. 6 is an illustration of a directed acyclic graph (DAG) produced as the consequence of vectorizing the random forest decision tree shown in FIG. 4 in accordance with an embodiment of the invention.

FIG. 6 is an illustration of DAG 600 produced as the consequence of vectorizing the random forest decision tree 400 shown in FIG. 4 in accordance with an embodiment of the invention. As shown in FIG. 6, DAG 600 is arranged to position comparisons involving a single feature near root 610. For example, all comparisons involving feature 4 are performed in root node 610 and all comparisons involving feature 2 are performed in the child nodes of root node 610.

Another advantageous aspect of DAG 600 is that multiple portions of DAG may be directed towards a single location. For example, notice that there are two separate paths in DAG 600 that end up at node 612. If the feature 4 is less than 0.1 or if feature 4 is in the range 0.1 to 0.3, the result of searching DAG 600 may be either 32 or 23. This logic is represented by the single portion of DAG 600, namely node 612. This is advantageous because, for a given set of feature values, the result values obtained from searching DAG 600 and random forest 400 are the same despite DAG 600 being represented by a smaller data set. Since DAG 600 can be represented using a smaller data set, the demand on cache memory is not as great, thereby freeing portions of the cache memory for other uses.

In this way, result values may be retrieved from random forest 600 using less computational resources. Indeed, feature 0 and feature 3 need not even be compared unless feature 2 and feature 4 fall within the specified range (namely feature 4 is between 0.3 and 0.5 and feature 2 is less than 367.4).

The computational resources saved by embodiments of the invention that employ a software encoder that employs a Single Instruction Multiple Data (SIMD) operation in traversing a random forest decision tree may be consumed in a variety of other fashions, such as by the software encoder to encode higher quality digital video or by other software applications executing on the same physical hardware as the software encoder of an embodiment. Advantageously, embodiments enable digital video to be encoded using fewer computational resources than prior approaches, thereby facilitating their use elsewhere. Accordingly, embodiments help mitigate and moderate the financial cost of supporting the delivery of high-quality digital video by large scale content delivery networks (CDN).

Implementing Mechanisms

Figure 7:
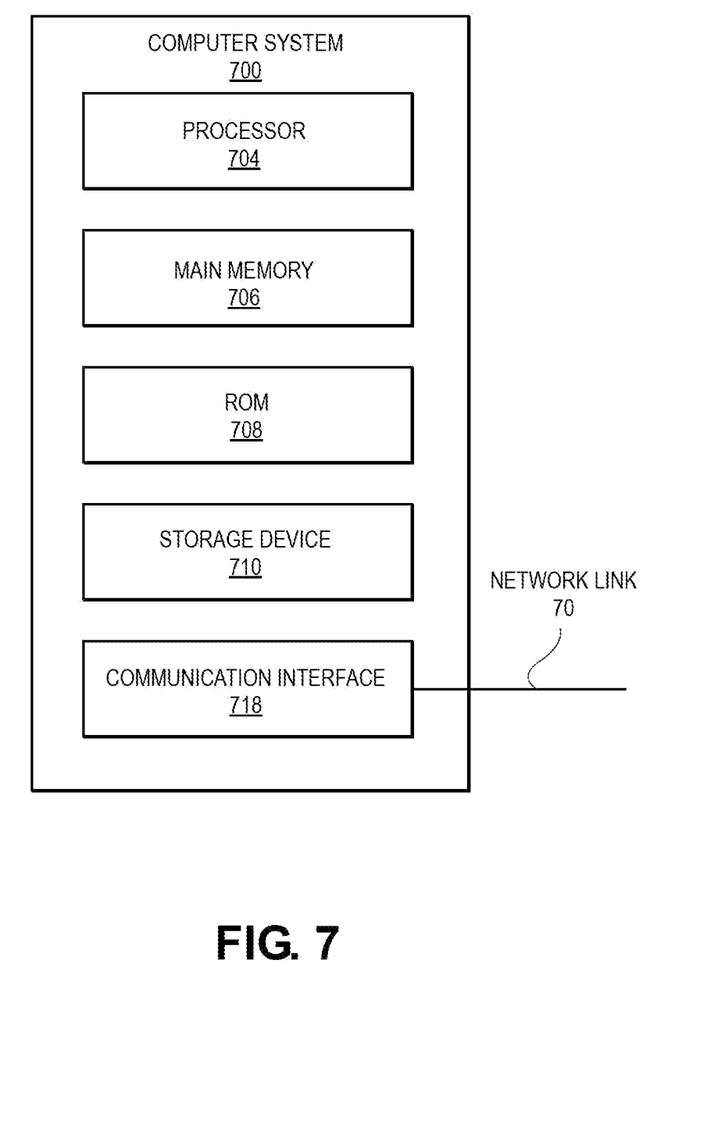
FIG. 7 is a block diagram of a computer system that may correspond to an origin device or a destination device shown in FIG. 1 in accordance with an embodiment of the invention.

FIG. 7 is a block diagram of a computer system that may correspond to an origin computer system 100 or a destination computer system 110 shown in FIG. 1 in accordance with an embodiment of the invention. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random-access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 704 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions, which when executed by one or more processors, cause:
    encoding a digital video using a Single Instruction Multiple Data (SIMD) operation by:
        a software encoder searching a decision tree in a random forest in furtherance of the encoding of the digital video by causing a physical hardware component to perform a single operation on multiple data operands concurrently,
        wherein said random forest is arranged to position comparisons involving a single feature, of the digital video presently being encoded, near the root of said decision tree.

2. The non-transitory computer-readable storage medium of claim 1, wherein the single operation is performed in estimating a complexity of a frame in said digital video.

3. The non-transitory computer-readable storage medium of claim 1, wherein said single operation is a comparison of two or more thresholds of a single feature of a single frame, or a portion thereof, of said digital video.

4. The non-transitory computer-readable storage medium of claim 1, wherein said decision tree comprises a child node having two or more predecessor nodes such that there are multiple paths when searching the decision tree to arrive at said child node.

5. The non-transitory computer-readable storage medium of claim 1, wherein said decision tree is represented as a directed acyclic graph (DAG).

6. An apparatus for encoding a digital video using a Single Instruction Multiple Data (SIMD) operation, comprising:
    one or more processors; and
    one or more non-transitory computer-readable storage storing one or more sequences of instructions, which when executed, cause:
        a software encoder searching a decision tree in a random forest in furtherance of the encoding of the digital video by causing a physical hardware component to perform a single operation on multiple data operands concurrently,
        wherein said random forest is arranged to position comparisons involving a single feature, of the digital video presently being encoded, near the root of said decision tree.

7. The apparatus of claim 6, wherein the single operation is performed in estimating a complexity of a frame in said digital video.

8. The apparatus of claim 6, wherein said single operation is a comparison of two or more thresholds of a single feature of a single frame, or a portion thereof, of said digital video.

9. The apparatus of claim 6, wherein said decision tree comprises a child node having two or more predecessor nodes such that there are multiple paths when searching the decision tree to arrive at said child node.

10. The apparatus of claim 6, wherein said decision tree is represented as a directed acyclic graph (DAG).

11. A method for encoding a digital video using a Single Instruction Multiple Data (SIMD) operation, comprising:
    a software encoder searching a decision tree in a random forest in furtherance of the encoding of the digital video by causing a physical hardware component to perform a single operation on multiple data operands concurrently,
    wherein said random forest is arranged to position comparisons involving a single feature, of the digital video presently being encoded, near the root of said decision tree.

12. The method of claim 11, wherein the single operation is performed in estimating a complexity of a frame in said digital video.

13. The method of claim 11, wherein said single operation is a comparison of two or more thresholds of a single feature of a single frame, or a portion thereof, of said digital video.

14. The method of claim 11, wherein said decision tree comprises a child node having two or more predecessor nodes such that there are multiple paths when searching the decision tree to arrive at said child node.

15. The method of claim 11, wherein said decision tree is represented as a directed acyclic graph (DAG).

* * * * *